US011032280B1

(12) United States Patent
Chhabra et al.

(10) Patent No.: US 11,032,280 B1
(45) Date of Patent: Jun. 8, 2021

(54) PROXY FOR CONTROLLING ACCESS TO SERVICES

(71) Applicant: Amazon Technologies, Inc., Seattle, WA (US)

(72) Inventors: Jasmeet Chhabra, Bellevue, WA (US); Hari Ganesh Natarajan, Redmond, WA (US)

(73) Assignee: Amazon Technologies, Inc., Seattle, WA (US)

( * ) Notice: Subject to any disclaimer, the term of this patent is extended or adjusted under 35 U.S.C. 154(b) by 574 days.

(21) Appl. No.: 15/841,104

(22) Filed: Dec. 13, 2017

(51) Int. Cl.
*H04L 29/06* (2006.01)
*G06F 21/33* (2013.01)
*H04L 29/08* (2006.01)

(52) U.S. Cl.
CPC ........ *H04L 63/0884* (2013.01); *G06F 21/335* (2013.01); *H04L 63/10* (2013.01); *H04L 63/06* (2013.01); *H04L 67/28* (2013.01)

(58) Field of Classification Search
CPC .... H04L 63/0884; H04L 67/28; G06F 21/335
See application file for complete search history.

(56) References Cited

U.S. PATENT DOCUMENTS

| | | | |
|---|---|---|---|
| 7,676,835 B2 | 3/2010 | Brannon et al. | |
| 7,937,669 B2 | 5/2011 | Zhang et al. | |
| 8,918,785 B1* | 12/2014 | Brandwine | G06F 9/45558 718/1 |
| 10,320,644 B1* | 6/2019 | Chen | H04L 41/142 |
| 2002/0010785 A1* | 1/2002 | Katsukawa | G06Q 20/02 709/229 |
| 2002/0035685 A1* | 3/2002 | Ono | H04L 63/0884 713/155 |
| 2002/0178271 A1* | 11/2002 | Graham | H04L 67/02 709/229 |
| 2003/0115342 A1* | 6/2003 | Lortz | H04L 63/0428 709/229 |
| 2005/0257247 A1* | 11/2005 | Moriconi | G06F 21/552 726/2 |
| 2006/0070129 A1* | 3/2006 | Sobel | H04L 63/105 726/23 |
| 2007/0160079 A1* | 7/2007 | Han | H04L 41/0893 370/465 |
| 2008/0016103 A1* | 1/2008 | Hall | G06F 21/10 |
| 2009/0285166 A1* | 11/2009 | Huber | H04W 48/20 370/329 |

(Continued)

*Primary Examiner* — Ponnoreay Pich
(74) *Attorney, Agent, or Firm* — Robert C. Kowert; Kowert, Hood, Munyon, Rankin & Goetzel, P.C.

(57) ABSTRACT

A provider network implements a proxy to control access to web-based resources of a provider network. The proxy receives requests to access web-based services. The proxy allows access to a web-based service only if user-configured access control rules are satisfied and credentials associated with the web-based service are authenticated. The proxy prevents access to a web-based service if user-configured access control rules are not satisfied or credentials associated with the web-based service are not authenticated. The provider network may also implement a proxy configuration service to set up and launch the proxy. The proxy configuration service receives from the client a specification of the access control rules, configures the proxy based on the access control rules, and launches the proxy.

20 Claims, 6 Drawing Sheets

(56) References Cited

U.S. PATENT DOCUMENTS

| | | | | |
|---|---|---|---|---|
| 2011/0167101 A1* | 7/2011 | Hopen | ................ | H04L 12/2856 |
| | | | | 709/202 |
| 2012/0089677 A1* | 4/2012 | Shafran | ............... | H04L 65/1016 |
| | | | | 709/204 |
| 2013/0138704 A1* | 5/2013 | Grateau | ................ | G06F 16/122 |
| | | | | 707/821 |
| 2015/0229521 A1* | 8/2015 | Mayer | ................. | H04L 41/0806 |
| | | | | 709/222 |
| 2016/0205143 A1* | 7/2016 | Bryson | ................ | H04L 63/205 |
| | | | | 726/1 |
| 2017/0244737 A1* | 8/2017 | Kuperman | .......... | H04L 63/1425 |
| 2017/0359306 A1* | 12/2017 | Thomas | ................. | H04L 63/10 |

\* cited by examiner

PROXY FOR CONTROLLING ACCESS TO SERVICES

BACKGROUND

Provider networks offer a variety of internet-based services to clients across the globe. To control access to its services, a provider network may authorize or deny requests for services. For example, an access management service of the provider network may identify a caller from a client site that requested the service and check permissions of the identified caller before authenticating the request for the service. Therefore, any caller at a client site with proper credentials and permissions may be allowed to use a particular service. However, a client (e.g., a company or other organization) may desire to provide other ways to prevent unauthorized access to services of the provider network.

Figure 1:
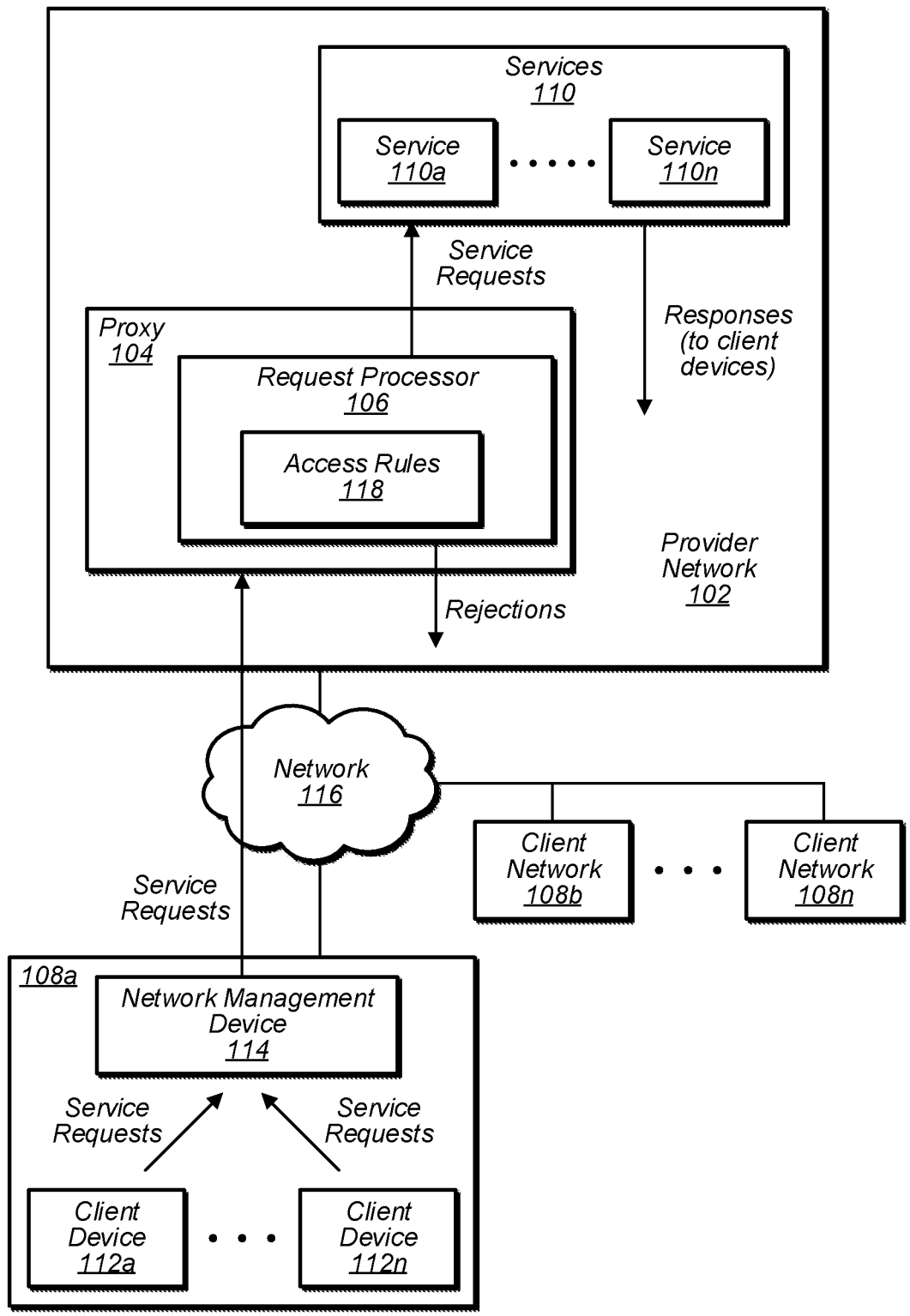
FIG. 1 illustrates a system for controlling access to services, according to some embodiments.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to.

DETAILED DESCRIPTION OF EMBODIMENTS

The systems and methods described herein implement controlling access to services of a provider network (or any other resources of the provider network). A proxy at a provider network may be configured and used to control access to services from client devices. To configure a proxy, a client may provide one or more access control rules to a proxy configuration service of a provider network. The proxy configuration service may configure a new proxy to use the access control rules. The proxy configuration service may then launch the proxy in order to begin controlling access to services using the access control rules.

In embodiments, the proxy may receive network traffic requests that each originate from a particular client site for a client of the provider network. Each network traffic request may be for a respective target resource (e.g., service) within the provider network. For each network traffic request, the proxy may authenticate credentials using an authentication service of the provider network. The proxy may also apply the one or more access rules to the network traffic request. The proxy may block the network traffic request from its target resource unless the network traffic request passes both the authentication and the one or more access control rules.

In some embodiments, the proxy receives one or more requests to access one or more web-based services (e.g., target resources). The proxy may allow access to the one or more web-based services only if one or more user-configured access control rules are satisfied and one or more credentials associated with the one or more web-based services are authenticated (e.g., by an authentication service). The proxy may prevent access to the one or more web-based services if the one or more user-configured access controls are not satisfied or the one or more credentials associated with the one or more web-based services are not authenticated.

In various embodiments, a client device, management device, or network management device may refer to any type of computing device suitable for communicating, via one or more networks, with one or more devices of a remote network (e.g., remote provider network) and/or any other devices of the same local network. In embodiments, an "endpoint" may be one or more computing devices and/or one more services that are part of a local network or a remote network, such that information may be transmitted to or from the endpoint via one or more network connections.

By using a client-configured proxy to control access to services of a provider network, various embodiments allow for advantages over traditional techniques for preventing unauthorized access to computing resources of a provider network. The advantages include improved security and prevention of unauthorized use of provider network resources that are not available using traditional techniques.

A traditional technique for preventing access may include using an authentication service of a provider network to authenticate credentials for a received service request before allowing the service request to access or use a target service (e.g., a request to store data using a storage service of the provider network). Despite using this technique, an unauthorized user may be able to upload confidential data from a corporate network to their own private storage area. The unauthorized user may log into the provider network using their own private account credentials and load confidential data to their own private storage area. However, by using a proxy to apply client-specified access control rules, the proxy may block the request from the unauthorized user. This allows clients to prevent unauthorized users and/or devices at a client site from sending data to the provider network using credentials that are authenticated but are not approved by the client.

In embodiments, by blocking unauthorized requests to target resources of a provider network, a proxy may reduce or eliminate network bandwidth usage due to unauthorized transmission of data and reduce or eliminate computing resources usage at the provider network (e.g., processors, memory, and/or storage) due to unauthorized use of target resources (e.g., services). Moreover, by allowing a client to provide custom access control rules that are tailored to the particular needs of the individual client, the amount of computing resources required to provide security may be reduced at the provider network and/or at the client site, while providing improved security through reduction or elimination of unauthorized use of provider network resources.

FIG. 1 illustrates a system for controlling access to services, according to some embodiments. The devices depicted in FIG. 1 may be the same type of device, and include some or all of the same components as other devices depicted in FIGS. 1-5, in embodiments. Although certain components of the provider network 102 and/or the proxy 104 are described as performing various actions, any of the actions described as performed by the provider network 102 and/or the proxy 104 may be performed by any hardware and/or software component of the provider network 102, the proxy 104, or any other components of the networks in FIGS. 1-5.

In the depicted embodiment, the proxy 104 includes a request processor 106 that receives requests from one or more client networks 108. In embodiments, the requests may be network traffic requests (e.g., messages sent via a network protocol such as hyper-text transport protocol (HTTP)). For example, the requests may be requests to access one or more web-based resources of the provider network 102, such as one or more of the services 110 (e.g., compute services or data storage services).

In an embodiment, the request processor 106 may implement one or more event-driven functions to process a given network traffic request. For example, the request processor 106 may launch an event-driven function in response to detecting that a new traffic request is received, process the request as described below, and then terminate the event-driven function (e.g., after forwarding the request to the targeted service specified by the request). By terminating the function, the computing resources of the provider network may be freed for use by other services or functions.

In embodiments, the client networks limit access to the provider network and/or to the services 110 by routing network traffic requests for the one or more services 110 to the proxy 104. For example, any requests sent from any of the client devices 112 to access one or more of the services 110 may be routed by a network management device 114 to be sent to the proxy 104 via a wide area network (e.g., the Internet).

In some embodiments, a request may be routed to the proxy 104 even though a destination address specified within the request is for one of the services 110. For example, the network management device 114 may re-route the request so that it is sent to the proxy 104 instead of the service 110 specified by the destination address. Thus, in embodiments, the network management device 114 may be a firewall or function in a say similar to a firewall that implements routing rules in order to re-route any requests for services 110 to be routed to the proxy 104.

In an embodiment, the network management device 114 may store or reference a list of destinations (e.g., destination network IP addresses) that correspond to endpoints for one or more of the services 110 and/or endpoints for any other locations/devices within the provider network 102. The network management device 114 may then re-route a request to the proxy 104 if the request specifies one of the destinations in the list of destinations. Thus, in embodiments, requests to access the services 110 and/or the provider network 102 are routed or re-routed to the proxy 104, even though the destination specified by a request is different than a destination network address of the proxy 104.

In embodiments, the proxy 104 includes a request processor 106 that applies one or more access control rules 118 to each network traffic request received by the proxy 104. In embodiments, the access control rules 118 are stored by the proxy 104 and/or referenced by the request processor in order to apply them to requests. As described below, some or all of the access control rules 118 may be specified by a client of the provider network 102.

In some embodiments, the proxy 104 verifies whether received requests for one or more services 110 are authentic based on one or more credentials provided for each request. Thus, the proxy 104 may authenticate a request or deny/reject a request as not authentic based on credentials provided with the request. In embodiments, the one or more credentials are associated with one or more of the services 110. For example, the one or more credentials provided with a request may indicate to the provider network 102 whether access to one or more services is authorized for the request. If so, then the request may be authenticated.

In various embodiments, any suitable technique for authenticating credentials may be used by the provider network 102 in order to verify whether received requests for one or more services 110 are authentic. For example, the provider network 102 and/or authentication service of the provider network 102 may store and access security data and/or identity data in order to authenticate a request or to reject a request. In embodiments, some or all of the credentials provided with a request may be encrypted (e.g., via one or more encryption keys). Thus, the provider network 102 may decrypt some or all of the credentials in order to verify whether a received request for one or more services 110 is authentic.

The security data may include client account data, user data for one or more users on the client account, security keys, certificates, and/or passwords for the client account and/or user accounts, and any other identity data or security data that may be used to determine whether to authenticate a request for one or more services 110 and to allow access to the one or more services 110. In embodiments, if the credentials provided with the request matches security data stored by the provider network 102 that corresponds to the credentials, then the provider network 102 authenticates the request and allows access to the requested service (e.g., forwards the request to the requested service). If not, then the provider network 102 may identify the request and/or credentials as not authentic and deny/block the request.

In embodiments, the authentication and/or verification of credentials for a request is performed by an authentication service. The authentication service may be a service of the provider network 102 and/or a service within the proxy 104. Thus, at least some of the authentication may take place within the proxy 104 or provider network 102. In some embodiments, some or all of the authentication may be performed outside of the provider network (e.g., by a service of a remote network).

In some embodiments, the proxy obtains information from the authentication and/or verification of credentials for a request. In embodiments, some or all of the information may be obtained from decrypting at least some of the credentials. In embodiments, some or all of the information may be obtained from the provider network 102. For example, the provider network 102 may access and retrieve identity and/or access-related information from a storage location based on the credentials of the request.

The information obtained from the authentication and/or verification of credentials may be used to apply access control rules described below. In embodiments, the proxy may obtain account information (e.g., account ID and/or account name) for a client of the provider network 102, user information (e.g., user ID and/or user name) for a user on an account for a client of the provider network 102, target resources (e.g., resource ID and/or resource name) of the provider network, a client device (e.g., device ID, network address, and/or device name) of a client site, and/or any other information provided within or with the request to be used for allowing or denying requests.

In embodiments, the proxy 104 allows access to one or more of the services 110 (and/or any other services or target resources external to the provider network 102) only if one or more of the access control rules 118 are satisfied and one or more credentials associated with the one or more services 110 are authenticated. Conversely, in embodiments, the proxy 104 prevents access to the one or more services 110 (and/or any other services or target resources external to the provider network 102) if the one or more access control rules 118 are not satisfied or if the one or more credentials associated with the one or more services are not authenticated. Therefore, in embodiments, a client may use customized access control rules 118 to provide an additional level of access control to services that goes beyond authentication of credentials.

As indicated above, in some embodiments, the proxy 104 may allow access or prevent access to one or more of the services and/or target resources that are external to the provider network 102. In embodiments, those services and/or target resources may exist in the client network, other client networks, or other remote networks (e.g., trusted third-party networks).

In various embodiments, the access control rules 118 may include any rule suitable for limiting access to requests or enabling access to requests that originate from a client site of a client (e.g., a client network 108) based on credentials provided with the requests and/or other information provided with the request. For example, an access control rule may specify a list (e.g., a "whitelist") of one or more accounts for a client of the provider network 102 that are allowed access to one or more of the services 110. If the credentials and/or information of the request indicates that the request belongs to one of the accounts specified by the whitelist, then the proxy may allow access to the one or more of the services 110. If not, then the proxy may reject the request and/or log the rejection of the request.

In an embodiment, an access control rule may specify a whitelist of one or more users of one or more respective accounts for a client of the provider network 102 that are allowed access to one or more of the services 110. If the credentials and/or information of the request indicates that the request belongs to one of the users specified by the whitelist, then the proxy may allow access to the one or more of the services 110. If not, then the proxy may reject the request and/or log the rejection of the request.

In some embodiments, an access control rule may specify a whitelist of one or more groups of users (e.g., an organization such as "Information Technology") of one or more respective accounts for a client of the provider network 102 that are allowed access to one or more of the services 110. If the credentials and/or information of the request indicates that the request belongs to one of the groups specified by the whitelist, then the proxy may allow access to the one or more of the services 110. If not, then the proxy may reject the request and/or log the rejection of the request.

In embodiments, an access control rule may specify a whitelist of one or more target resources (e.g., web-based services 110) of the provider network 102 that requests from a client site (e.g., client network 108) may be directed to. If the credentials and/or information of the request indicates that the request is directed to one or more of the target resources specified by the whitelist, then the proxy may allow access to the one or more target resources. If not, then the proxy may reject the request and/or log the rejection of the request.

In some embodiments, an access control rule may specify a whitelist of one or more devices of a client site (e.g., client devices 112 of a client network 108 such as video surveillance cameras) that are allowed access to one or more of the services 110. If the credentials and/or information of the request indicates that the request originates from one of the devices specified by the whitelist, then the proxy may allow access to the one or more of the services 110. If not, then the proxy may reject the request and/or log the rejection of the request.

In an embodiment, the whitelist of devices may include a whitelist of source network IP addresses for respective devices that are allowed access to the one or more of the services 110. Thus, if the credentials and/or information of the request indicates that the source network IP address matches one of the source network IP addresses specified by the whitelist, then the proxy may allow access to the one or more of the services 110. If not, then the proxy may reject the request and/or log the rejection of the request.

In various embodiments, one or more access control rules 118 may include a combination of one or more of the above types of access control rules 118 in order to control access to one or more services 110. For example, an access control rule may specify one or more of: a whitelist of one or more accounts for a client, a whitelist of one or more users of one or more respective accounts for the client, a whitelist of one or more groups of users of one or more respective accounts for the client, a whitelist of one or more target resources that requests from the client site may be directed to, and a whitelist of one or more devices of a client site.

As shown, a rejection may be sent from the request processor 106 when a request is rejected. In embodiments, the rejection may be a network protocol message that is delivered to the client device and/or the client network that originated the corresponding request. In some embodiments, the proxy 104 logs the rejection. For example, the proxy 104 may store an indication that the corresponding request was rejected, as well as information associated with the request (e.g., source network IP address, the requested target resource, etc.).

In some embodiments, the proxy 104 may update the access control rules based on analysis of request traffic and/or request rejections due to the access control rules and/or authentication. Thus, in embodiments, the proxy 104 may actively update the access control rules on an ongoing basis. In embodiments, the proxy uses a self-learning modification system (e.g., via a machine learning model or other artificial intelligence) to identify requests that are attacks or likely to be attacks based on identified information in a request and/or other request characteristics. In response, the proxy may update the access control rules to reject requests that include the identified information and/or that have the identified request characteristics.

After a request is allowed and processed by a service 110, the service may provide a response. In embodiments, the response is transmitted to the client device that originated the request (e.g., via a network protocol message), without any processing of the request by the proxy 104. Thus, in embodiments, the proxy 104 may serve as a gateway for allowing or rejecting requests to services and hands off processing to the service. In some embodiments, the proxy 104 may perform further processing associated with the request. For example the proxy 104 may log information associated with the response of a service that processed the request (e.g., time that the service sent the response, amount of time between forwarding the request to the service and sending of the response from the service, etc.).

In some embodiments, the access control rules may be pushed and/or propagated from the proxy to the network management device and/or any other client devices of the client network. For example, the proxy may send the access control rules to the network management device and/or any other client devices in response to initial setup of the proxy and/or in response to updating of the access control rules. This may allow an administrator to determine and verify what the current access control rules are.

Figure 2:
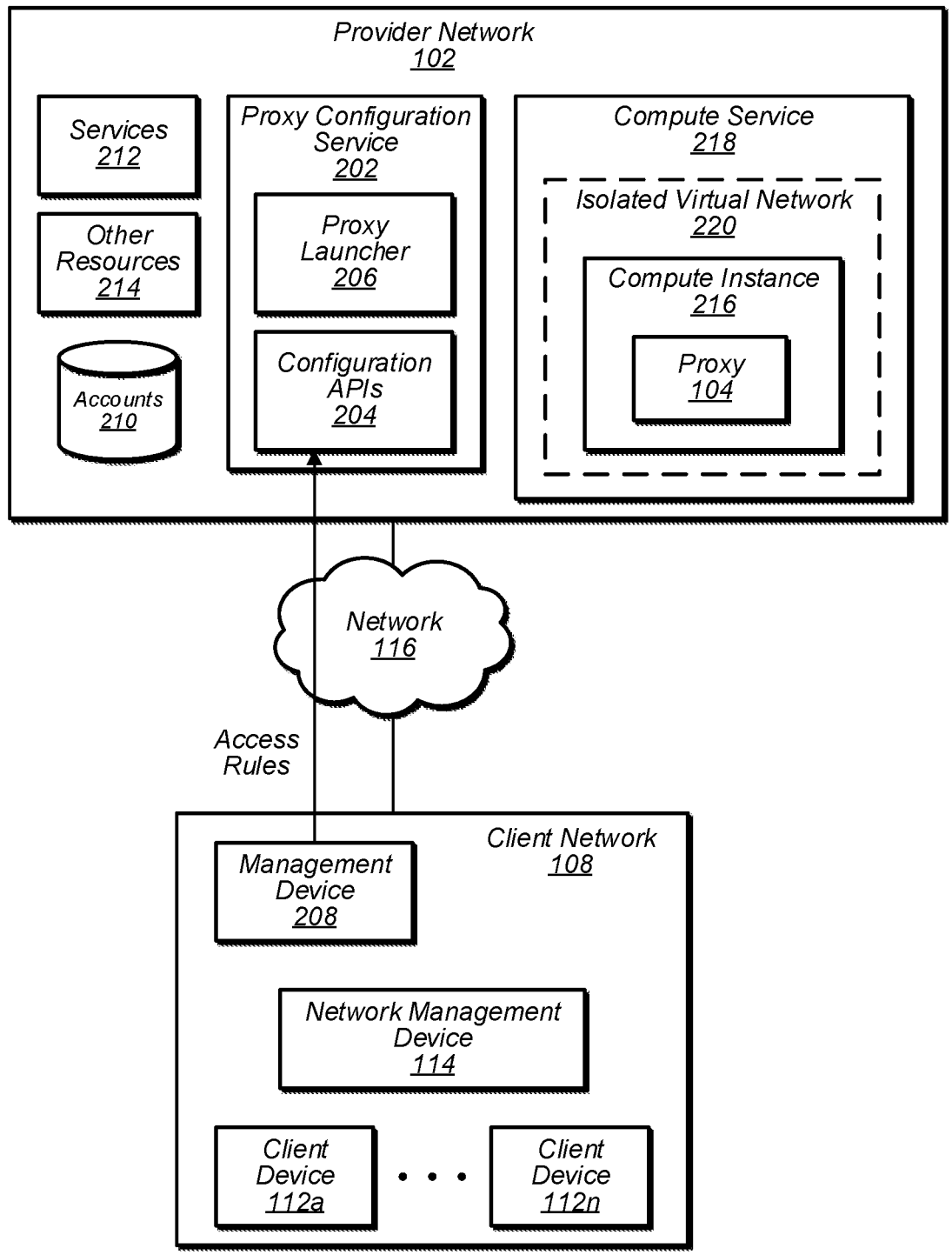
FIG. 2 illustrates a system for configuring a proxy to control access to services, according to some embodiments.

FIG. 2 illustrates a system for configuring a proxy to control access to services, according to some embodiments. In the depicted embodiment, a proxy configuration service 202 may be used to configure and launch a proxy 104 at the provider network 102. As shown, the proxy configuration service 202 may include configuration application programming interfaces (APIs) 204 and a proxy launcher 206.

In embodiments, a management device 208 of a client network 108 may be used to configure the proxy 104. For example, a user may provide configuration information (e.g., one or more access control rules and/or other information) or commands via a graphical user interface, command line interface, and/or other APIs of the management device 208. The management device 208 communicates the configuration information to the proxy configuration service 202 via the configuration APIs 204.

As discussed above, a user may specify a whitelist of one or more client accounts or users of client accounts via the management device 208. In embodiments, this account information, including authentication-related security information, may be stored by the provider network 102 in an accounts 210 data store.

In an embodiment, the user may specify a whitelist of one or more services 110 and/or a whitelist of one or more other target resources 214 of the provider network 102. For example, the proxy may allow access to one or more web-based services for a particular request if the request is directed to a target resource of the whitelist of target resources. Otherwise, the proxy may reject access for the particular request.

In some embodiments, the user may specify a whitelist of devices of a client site (e.g., via device identifiers and/or network IP addresses of the devices). Thus, in embodiments, the proxy may allow access to one or more web-based services for a particular request if the request originates from one of the devices included in the whitelist of devices. Otherwise, the proxy may reject access for the particular request.

In an embodiment, after the access control rules and/or other configuration information has been provided to the proxy configuration service 202, the proxy launcher 206 may launch the proxy 104. In embodiments, the proxy may be launched in response to receiving a command from the management device 208 (e.g., a user requesting the launch via a user interface).

In some embodiments, the proxy launcher 206 may launch the proxy 104 within a compute instance 216 of a compute service 218. In embodiments, the compute instance 216 may include an execution environment configured to run the proxy 104. In some embodiments, the compute instance 216 may run within an isolated virtual network 220 that is accessible to a particular client (or client account) that owns or manages the client network 108. Thus, in embodiments, the proxy 104 may only be usable by a particular client and/or client network 108.

In embodiments, the isolated virtual network 220 may provide an additional layer of privacy and data security for processing requests to and from the client network 108. In some embodiments, the proxy configuration service may launch the compute instance within an isolated virtual network of the provider network and then launch the proxy within the compute instance.

In various embodiments, one or more additional proxies 104 may be launched in respective compute instances 216 to process requests from the client network 108. For example, additional proxies may be required to handle a larger number of requests. In such cases, the proxies may be configured in the same or similar way (e.g., with the same access control rules). Thus, requests may be routed (e.g., via a load balancer) to a particular proxy of the multiple proxies depending on the current load of each of the proxies. For example, a new request may be distributed to the proxy with the lowest processing load out of the available proxies.

In some embodiments, the proxy configuration service may receive from the client an indication of changes to the one or more access control rules (e.g., via a user using the management device or via an application) and update the one or more access control rules based on the changes. For example, a user may specify one or more new accounts to be added to a whitelist (e.g., any of the whitelists described herein) or one or more accounts to be removed from a whitelist.

In an embodiment, the proxy configuration service may receive from an organization service of the provider network an indication of changes to the one or more access control rules and update the one or more access control rules based on the changes. For example, the organization service at the provider network may store and/or maintain a list of accounts, users, and/or groups of users for a particular client as well as permissions associated with the accounts, users, and/or groups of users.

In embodiments, if an account, user, and/or group of users is added to the organization service or removed from the organization service, then the service may provide the changes to the proxy configuration service, which in turn may modify the access control rules. For example, the proxy configuration service may add to a whitelist of accounts, users, or groups of users one or more new accounts that were added to the organization service or delete from a whitelist one or more accounts that were removed from the organization service. Thus, the provider network and/or the proxy configuration service may automatically update one or more whitelists in response to organizational changes.

Figure 3:
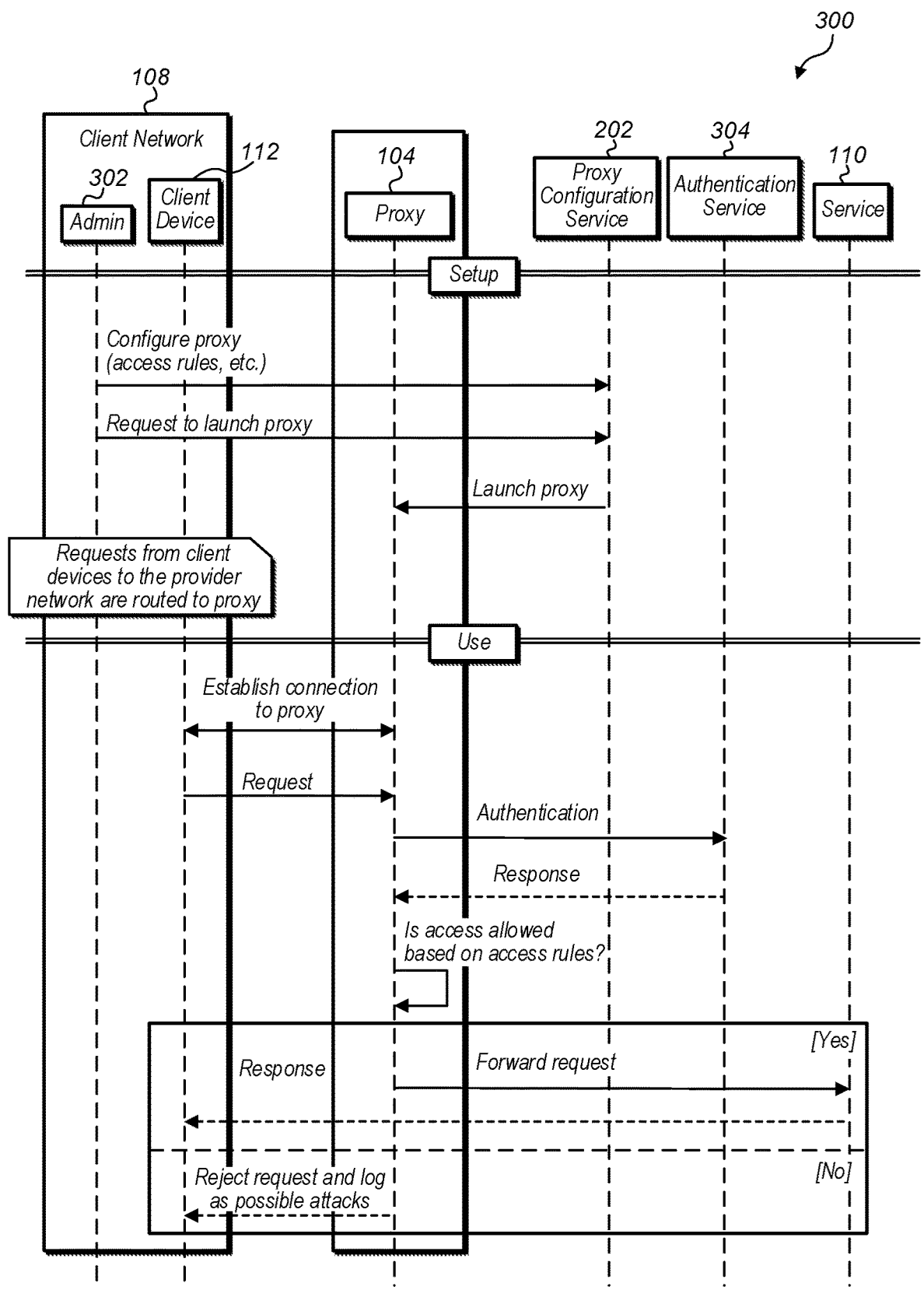
FIG. 3 illustrates a process for configuring a proxy and using the proxy to control access to services, according to some embodiments.

FIG. 3 illustrates a process for configuring a proxy and using the proxy to control access to services, according to some embodiments. As shown, to set up a proxy, a user (e.g., administrator 302) of a client may use a proxy configuration service to configure the proxy for a client site as described above. For example, the user may provide access control rules to be used by the proxy to control access to services for requests that originate from devices of the client site.

In embodiments, the user may request the proxy configuration service to launch the proxy. The proxy configuration service may then launch the proxy. In embodiments, the proxy may be launched within an isolated virtual private network, as indicated by the box enclosing the proxy. After the proxy is launched, any requests from the client devices of the client site will be received by the proxy.

In some embodiments, to use the proxy, a connection is established between the proxy and a client device that originates the request. In some embodiments, a persistent connection (e.g., a transport control protocol (TCP) connection) may be established. A network traffic request may then be sent to the proxy. For example, the network traffic request may be a request to access one or more web-based services of the provider network.

In an embodiment, in response to receiving the request, the proxy authenticates the request. For example, the proxy may send credentials of the request to be processed by an authentication service 304. In embodiments, the authentication service may then send a response back to the proxy. The response may indicate whether the request has been authenticated. The response may also include other information, as described above (e.g., account ID, user ID, etc.).

As shown, the proxy may then determine whether access is allowed to the one or more services indicated in the request. In embodiments, the proxy may apply the access control rules that were provided during the proxy set up phase. If the access rules are satisfied, then the proxy may forward the request to the indicated one or more services. In embodiments, one or more of the services may then provide a response to the client device that originated the request.

In some embodiments, in response to receiving the forwarded request from the proxy, the service may perform its own authentication on the request to determine and/or identify whether the request is authorized and/or allowed to access the service. For example, the service may perform some or all of the authentication steps described above. In some embodiments, the service may inspect the same and/or additional information provided with the request and/or credentials and then allow or deny access to the service based on the same and/or additional information.

In embodiments, if the access rules are not satisfied, then the proxy may reject the request and log the rejected request as associated with a possible attack. In some embodiments, the proxy may send the log or other information to the client site that indicates the rejected request and/or the possible attack. In embodiments, the provider network may provide the information for the rejected request to an attack detection service that analyzes rejected requests, determines whether an attack in progress based on the analysis, and provides an indication of the attack to the client (e.g., to an administrator at the client site).

Figure 4:
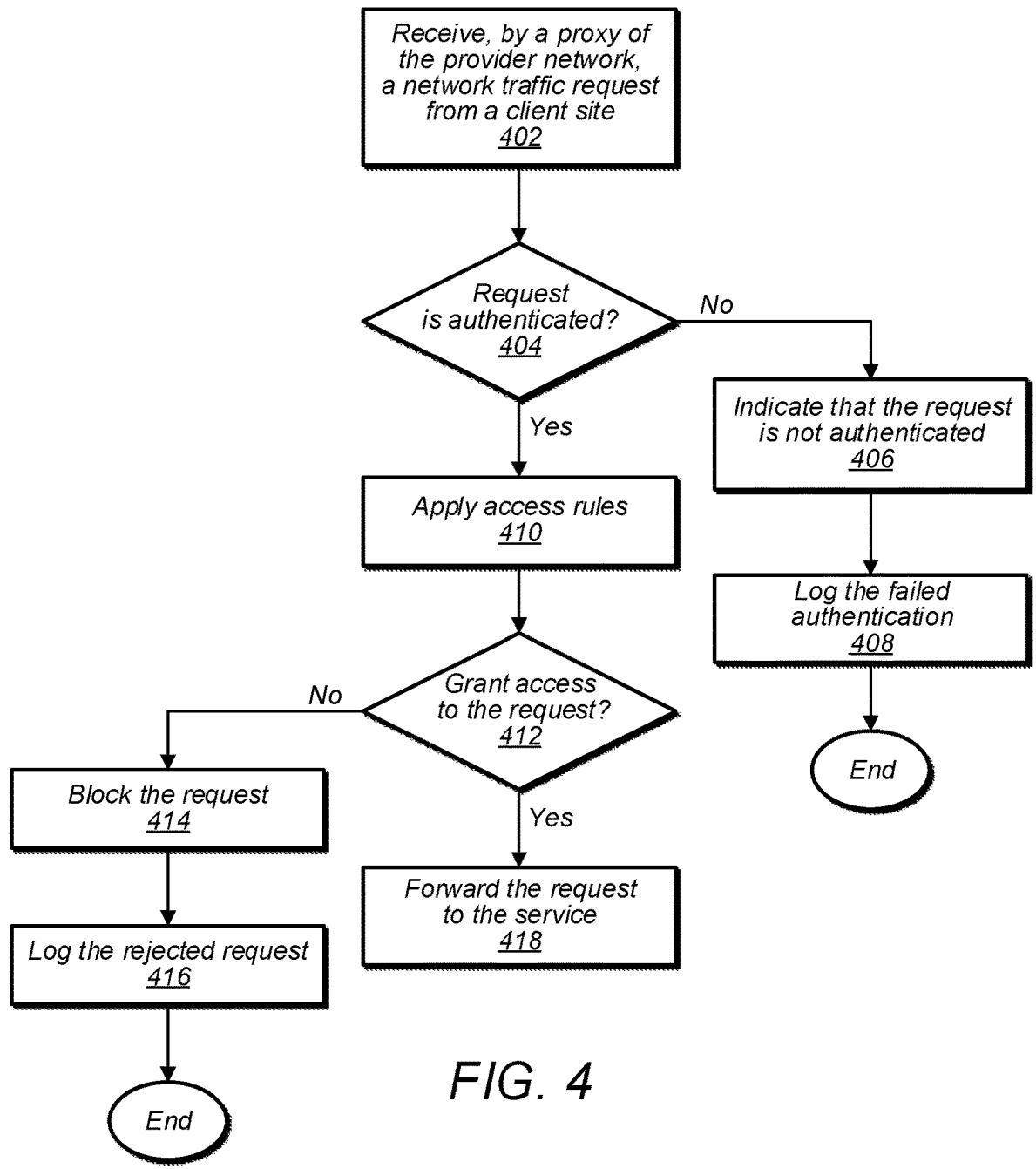
FIG. 4 is a flow diagram illustrating use of a proxy to control access to services, according to some embodiments.

FIG. 4 is a flow diagram illustrating use of a proxy to control access to services, according to some embodiments. In various embodiments, one or more portions of the illustrated processes of FIGS. 4 and 6 may be performed via any of one or more devices, components, or services of a provider network 102 and/or client network 108.

At block 402, the proxy receives a network traffic request (e.g., for one or more web-based services) from a client site. At block 304, the proxy determines or identifies whether the request is authenticated. If not, then at block 406, the proxy indicates that the request is not authenticated. For example the proxy may send the indication to the client. At block 408, the proxy may log the failed authentication of the request. The process then ends.

At block 404, if the proxy determines or identifies that the request is authenticated, then at block 410, the proxy applies one or more access rules. At block 412, the proxy determines or identifies whether the request is allowed based on the application of the access control rules. For example, the proxy may determine whether to grant access to the request and/or authorize the request to access the service. If not, then at block 414, the proxy blocks the request. The proxy may also indicate that the request was blocked. For example the proxy may send the indication to the client.

At block 416, the proxy may log the rejected request. In embodiments, the proxy may log one or more of the network traffic requests that do not pass the one or more access control rules and/or provide to the client an indication of the one or more network traffic requests that did not pass the one or more access control rules. In some embodiments, the proxy may provide the above information on a periodic basis (e.g., hourly, daily, etc.) or upon request from the client. The process then ends.

At block 412, if the proxy determines or identifies that the request is allowed (e.g., granted access and/or authorized) based on the application of the access control rules, then at block 418, the proxy forwards the request to the target service indicated by the request. If there are additional requests, the process may return to block 402.

Figure 5:
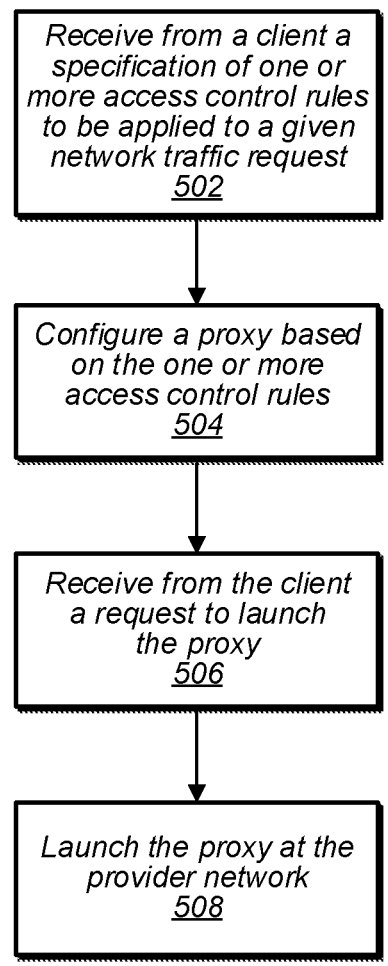
FIG. 5 is a flow diagram illustrating configuration and launching of a proxy to control access to services, according to some embodiments.

FIG. 5 is a flow diagram illustrating configuration and launching of a proxy to control access to services, according to some embodiments.

At block 502, a proxy configuration service receives from a client a specification of one or more access control rules to be applied to a given network traffic request received from a client site. For example, an administrator at the client site may provide the information using a management device.

At block 504, the proxy configuration service configures a proxy based on the one or more access control rules. In some embodiments, the proxy configuration service may configure software and/or hardware resources to implement the proxy to control access to services based on the one or more access control rules. The configuration may include configuring, launching, and/or initializing hardware and/or software required to implement a compute instance (e.g., including an execution environment). In embodiments, the configuration may include configuring, launching, and/or initializing hardware and/or software required to implement an isolated virtual private network to host the compute instance.

At block 506, the proxy configuration service receives from the client (e.g., an administrator) a request to launch the proxy. At block 508, the proxy configuration service launches the proxy at the provider network. In embodiments, the proxy configuration service may launch the proxy within a compute instance and/or an isolated virtual private network of the provider network.

Figure 6:
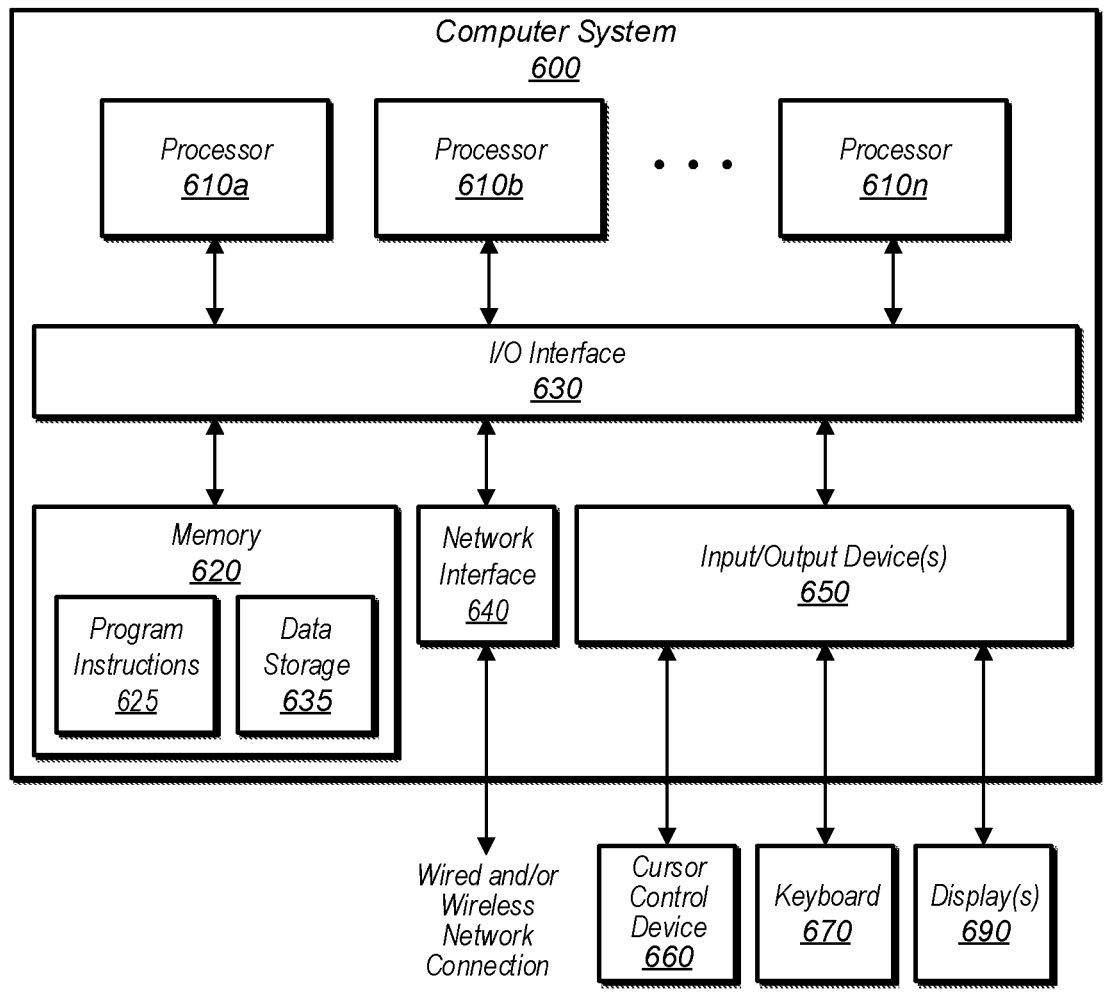
FIG. 6 is a block diagram illustrating an example computer system that implements some or all of the techniques described herein, according to some embodiments.

Any of various computer systems may be configured to implement processes associated with controlling access to services of a provider network. For example, FIG. 6 is a block diagram illustrating one embodiment of a computer system suitable for implementing at least some of the systems and methods described herein. In various embodiments, the computing devices or the client networks or computing devices that implement services of the provider network 102, and/or any other described components may each include one or more computer systems 700 such as that illustrated in FIG. 6 or one or more components of the computer system 600 that function in a same or similar way as described for the computer system 600.

In the illustrated embodiment, computer system 600 includes one or more processors 610 coupled to a system memory 620 via an input/output (I/O) interface 630. Computer system 600 further includes a network interface 640 coupled to I/O interface 630. In some embodiments, computer system 600 may be illustrative of servers implementing enterprise logic or downloadable application, while in other embodiments servers may include more, fewer, or different elements than computer system 600.

In various embodiments, computer system 600 may be a uniprocessor system including one processor 610, or a multiprocessor system including several processors 610 (e.g., two, four, eight, or another suitable number). Processors 610 may be any suitable processors capable of executing instructions. For example, in various embodiments, processors 610 may be embedded processors implementing any of a variety of instruction set architectures (ISAs), such as the x86, PowerPC, SPARC, or MIPS ISAs, or any other suitable ISA. In multiprocessor systems, each of processors 610 may commonly, but not necessarily, implement the same ISA.

System memory 620 may be configured to store instructions and data accessible by processor 610. In various embodiments, system memory 620 may be implemented using any suitable memory technology, such as static random access memory (SRAM), synchronous dynamic RAM (SDRAM), non-volatile/Flash-type memory, or any other type of memory. In the illustrated embodiment, program instructions and data implementing desired functions, such as those methods and techniques described above for the downloadable software or service provider are shown stored within system memory 620 as program instructions 625. In some embodiments, system memory 620 may include data 635 which may be configured as described herein.

In one embodiment, I/O interface 630 may be configured to coordinate I/O traffic between processor 610, system memory 620 and any peripheral devices in the system, including through network interface 640 or other peripheral interfaces. In some embodiments, I/O interface 630 may perform any necessary protocol, timing or other data transformations to convert data signals from one component (e.g., system memory 620) into a format suitable for use by another component (e.g., processor 610). In some embodiments, I/O interface 630 may include support for devices attached through various types of peripheral buses, such as a variant of the Peripheral Component Interconnect (PCI) bus standard or the Universal Serial Bus (USB) standard, for example. In some embodiments, the function of I/O interface 630 may be split into two or more separate components, such as a north bridge and a south bridge, for example. Also, in some embodiments, some or all of the functionality of I/O interface 630, such as an interface to system memory 620, may be incorporated directly into processor 610.

Network interface 640 may be configured to allow data to be exchanged between computer system 600 and other devices attached to a network, such as between the connected device 100 and other computer systems, for example. In particular, network interface 640 may be configured to allow communication between computer system 600 and/or various I/O devices 650. I/O devices 650 may include scanning devices, display devices, input devices and/or other communication devices, as described herein. Network interface 640 may commonly support one or more wireless networking protocols (e.g., Wi-Fi/IEEE 802.7, or another wireless networking standard). However, in various embodiments, network interface 640 may support communication via any suitable wired or wireless general data networks, such as other types of Ethernet networks, for example. Additionally, network interface 640 may support communication via telecommunications/telephony networks such as analog voice networks or digital fiber communications networks, via storage area networks such as Fibre Channel SANs, or via any other suitable type of network and/or protocol.

In some embodiments, system memory 620 may be one embodiment of a computer-accessible medium configured to store program instructions and data as described above. However, in other embodiments, program instructions and/or data may be received, sent or stored upon different types of computer-accessible media. Generally speaking, a computer-accessible medium may include computer-readable storage media or memory media such as magnetic or optical media, e.g., disk or DVD/CD-ROM coupled to computer system 600 via I/O interface 630. A computer-readable storage medium may also include any volatile or non-volatile media such as RAM (e.g. SDRAM, DDR SDRAM, RDRAM, SRAM, etc.), ROM, etc., that may be included in some embodiments of computer system 600 as system memory 620 or another type of memory. Further, a computer-accessible medium may include transmission media or signals such as electrical, electromagnetic, or digital signals, conveyed via a communication medium such as a network and/or a wireless link, such as may be implemented via network interface 640.

In some embodiments, I/O devices 650 may be relatively simple or "thin" client devices. For example, I/O devices 650 may be configured as dumb terminals with display, data entry and communications capabilities, but otherwise little computational functionality. However, in some embodiments, I/O devices 650 may be computer systems configured similarly to computer system 600, including one or more processors 610 and various other devices (though in some embodiments, a computer system 600 implementing an I/O device 650 may have somewhat different devices, or different classes of devices).

In various embodiments, I/O devices 650 (e.g., scanners or display devices and other communication devices) may include, but are not limited to, one or more of: handheld devices, devices worn by or attached to a person, and devices integrated into or mounted on any mobile or fixed equipment, according to various embodiments. I/O devices 650 may further include, but are not limited to, one or more of: personal computer systems, desktop computers, rack-mounted computers, laptop or notebook computers, workstations, network computers, "dumb" terminals (i.e., computer terminals with little or no integrated processing ability), Personal Digital Assistants (PDAs), mobile phones, or other handheld devices, proprietary devices, printers, or any other devices suitable to communicate with the computer system 600. In general, an I/O device 650 (e.g., cursor control device, keyboard, or display(s) may be any device that can communicate with elements of computing system 600.

The various methods as illustrated in the figures and described herein represent illustrative embodiments of methods. The methods may be implemented manually, in software, in hardware, or in a combination thereof. The order of any method may be changed, and various elements may be added, reordered, combined, omitted, modified, etc. For example, in one embodiment, the methods may be implemented by a computer system that includes a processor executing program instructions stored on a computer-readable storage medium coupled to the processor. The program instructions may be configured to implement the functionality described herein (e.g., the functionality of the computing devices, various services or components of the provider network, databases, devices and/or other communication devices, etc.).

Various modifications and changes may be made as would be obvious to a person skilled in the art having the benefit of this disclosure. It is intended to embrace all such modifications and changes and, accordingly, the above description to be regarded in an illustrative rather than a restrictive sense.

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, volatile or non-volatile media such as RAM (e.g. SDRAM, DDR, RDRAM, SRAM, etc.), ROM, etc., as well as transmission media or signals such as electrical, electromagnetic, or digital signals, conveyed via a communication medium such as network and/or a wireless link.

What is claimed is:

1. A system, comprising:
one or more computing devices of a provider network comprising respective processors and memory to implement a proxy to:
receive network traffic requests at the proxy, wherein each network traffic request originates from a same client site for a client of the provider network and is for a respective target resource within the provider network;
authenticate, by the proxy, respective credentials for each network traffic request with an authentication service of the provider network, wherein the credentials comprise security data associated with the respective target resource used to determine whether access for the network traffic request to the respective target resource is authorized by the respective target resource;
apply, by the proxy, one or more access control rules to each network traffic request, wherein the one or more access control rules indicate whether access to the respective target resource is allowed for the network traffic request and are specified by the client prior to the network traffic requests; and
block, at the proxy, each network traffic request from its respective target resource within the provider network unless the network traffic request passes both the authentication of the security data associated with the respective target resource and the one or more client-defined access control rules.

2. The system as recited in claim 1, wherein the access control rules comprise one or more of a whitelist of accounts for the client of the provider network, a whitelist of users of the accounts, or a whitelist of target resources of the provider network, and wherein to block a particular network traffic request, the one or more computing devices are configured to implement the proxy to:
identify the request as not belonging to one or more of the whitelist of accounts or the whitelist of users, or as not directed to a target resource of the whitelist of target resources.

3. The system as recited in claim 1, wherein the one or more computing devices are configured to implement a proxy configuration service to:
receive from the client a specification of the one or more access control rules;
configure the proxy based on the one or more access control rules; and
launch the proxy.

4. The system as recited in claim 3, wherein the one or more computing devices are configured to implement the proxy configuration service to:
receive from the client an indication of changes to the one or more access control rules; and
update the one or more access control rules based on the changes.

5. The system as recited in claim 1, wherein the one or more computing devices are configured to implement the proxy to:
log one or more of the network traffic requests that do not pass the one or more access control rules; and
provide to the client an indication of the one or more network traffic requests that did not pass the one or more access control rules.

6. A method, comprising:
receiving one or more requests to access one or more web-based services;
allowing access to the one or more web-based services only if one or more user-configured access control rules are satisfied and one or more credentials associated with the one or more web-based services are authenticated, wherein the one or more credentials comprise security data associated with the one or more web-based services used to determine whether access for the one or more requests to the one or more web-based services is authorized by the one or more web-based services, and wherein the one or more user-configured access control rules are specified prior to the one or more requests to access; and
preventing access to the one or more web-based services if the one or more user-configured access control rules are not satisfied or the one or more credentials associated with the one or more web-based services are not authenticated.

7. The method as recited in claim 6, wherein the access control rules comprise one or more of a whitelist of accounts for a client of a provider network that provides the one or more web-based services, or a whitelist of users of the accounts, and further comprising:
allowing access to the one or more web-based services for a particular request if the request belongs to one or more of the whitelist of accounts or the whitelist of users.

8. The method as recited in claim 6, wherein the one or more requests originate from a client site for a client of a provider network that provides the one or more web-based services, and further comprising:
receiving from the client a specification of the one or more access control rules;
configuring a proxy based on the one or more access control rules; and
launching the proxy, wherein the proxy performs the receiving one or more requests, the allowing access to the one or more web-based services based on the one or more access control rules, and the preventing access to the one or more web-based services based on the one or more access control rules.

9. The method as recited in claim 8, further comprising:
launching a compute instance within an isolated virtual network of the provider network; and
launching the proxy within the compute instance.

10. The method as recited in claim 8, further comprising:
receiving from the client an indication of changes to the one or more access control rules; and
updating the one or more access control rules based on the changes.

11. The method as recited in claim 6, wherein the one or more requests comprise network traffic requests, and wherein allowing access to the one or more web-based services comprises:
forwarding the one or more network traffic requests to the one or more web-based services.

12. The method as recited in claim 6, wherein the access control rules comprise a whitelist of devices of a client site for a client of a provider network that provides the one or more web-based services, and further comprising:
    allowing access to the one or more web-based services for a particular request if the request originates from one of the devices included in the whitelist of devices.

13. The method as recited in claim 6, wherein the access control rules comprise a whitelist of target resources of the provider network, and further comprising:
    allowing access to the one or more web-based services for a particular request if the request is directed to a target resource of the whitelist of target resources.

14. The method as recited in claim 6, further comprising:
    logging one or more of the requests that do not satisfy the one or more access control rules; and
    providing to a client site an indication of the one or more requests that did not satisfy the one or more access control rules.

15. A non-transitory computer-readable storage medium storing program instructions that, when executed by one or more computing devices of a provider network, cause the one or more computing devices to implement:
    receiving one or more requests to access one or more web-based services;
    allowing access to the one or more web-based services only if one or more user-configured access control rules are satisfied and one or more credentials associated with the one or more web-based services are authenticated, wherein the one or more credentials comprise security data associated with the one or more web-based services used to determine whether access for the one or more requests to the one or more web-based services is authorized by the one or more web-based services, and wherein the one or more user-configured access control rules are specified prior to the one or more requests to access; and
    preventing access to the one or more web-based services if the one or more user-configured access controls are not satisfied or the one or more credentials associated with the one or more web-based services are not authenticated.

16. The computer-readable storage medium as recited in claim 15, wherein the access control rules comprise one or more of a whitelist of accounts for a client of a provider network that provides the one or more web-based services, or a whitelist of users of the accounts, and wherein the program instructions cause the one or more computing devices to implement:
    allowing access to the one or more web-based services for a particular request if the request belongs to one or more of the whitelist of accounts or the whitelist of users.

17. The computer-readable storage medium as recited in claim 15, wherein the one or more requests originate from a client site for a client of a provider network that provides the one or more web-based services, and wherein the program instructions cause the one or more computing devices to implement:
    receiving from the client a specification of the one or more access control rules;
    configuring a proxy based on the one or more access control rules; and
    launching the proxy, wherein the proxy performs the receiving one or more requests, the allowing access to the one or more web-based services based on the one or more access control rules, and the preventing access to the one or more web-based services based on the one or more access control rules.

18. The computer-readable storage medium as recited in claim 17, wherein the program instructions cause the one or more computing devices to implement:
    launching a compute instance within an isolated virtual network of the provider network; and
    launching the proxy within the compute instance.

19. The computer-readable storage medium as recited in claim 17, wherein the program instructions cause the one or more computing devices to implement:
    receiving from the client an indication of changes to the one or more access control rules; and
    updating the one or more access control rules based on the changes.

20. The computer-readable storage medium as recited in claim 15, wherein the program instructions cause the one or more computing devices to implement:
    logging one or more of the requests that do not satisfy the one or more access control rules; and
    providing to a client site an indication of the one or more requests that did not satisfy the one or more access control rules.

* * * * *